United States Patent
Howard et al.

(10) Patent No.: US 8,117,843 B2
(45) Date of Patent: Feb. 21, 2012

(54) OCEAN THERMAL ENERGY CONVERSION SYSTEM

(75) Inventors: Robert James Howard, Clifton, VA (US); Nicholas J. Nagurny, Manassas, VA (US); Laurie E. Meyer, Hamilton, VA (US); John W. Rapp, Manassas, VA (US)

(73) Assignee: Lockheed Martin Corporation, Betheada, MD (US)

( * ) Notice: Subject to any disclaimer, the term of this patent is extended or adjusted under 35 U.S.C. 154(b) by 555 days.

(21) Appl. No.: 12/328,661

(22) Filed: Dec. 4, 2008

(65) Prior Publication Data

US 2010/0139272 A1    Jun. 10, 2010

(51) Int. Cl.
*F03G 7/04*    (2006.01)
(52) U.S. Cl. .................................. 60/641.7; 60/641.6
(58) Field of Classification Search .............. 60/641.6, 60/641.7
See application file for complete search history.

(56) References Cited

U.S. PATENT DOCUMENTS

| | | | |
|---|---|---|---|
| 3,715,885 A | 2/1973 | Schur | |
| 3,896,622 A | 7/1975 | Daniello | |
| 3,995,160 A | 11/1976 | Zener et al. | |
| 4,027,479 A | 6/1977 | Cory | |
| 4,166,363 A | 9/1979 | Mougin | |
| 4,170,878 A | 10/1979 | Jahnig | |
| 4,209,991 A * | 7/1980 | Anderson | 60/641.7 |
| 4,233,813 A | 11/1980 | Simmons | |
| 4,281,514 A | 8/1981 | Egerer | |
| 4,325,216 A | 4/1982 | Mermis | |
| 4,327,552 A | 5/1982 | Dukess | |
| 4,350,014 A | 9/1982 | Sanchez et al. | |
| 4,355,513 A | 10/1982 | Girden | |
| 5,291,847 A | 3/1994 | Webb | |
| 5,303,552 A | 4/1994 | Webb | |
| 5,513,494 A * | 5/1996 | Flynn et al. | 60/641.7 |
| 5,685,147 A | 11/1997 | Brassea | |
| 2008/0314043 A1 * | 12/2008 | Howard et al. | 60/641.7 |

OTHER PUBLICATIONS

Jack Jones and Yi Chao, "Mechanics/Machinery", "NASA Tech Briefs", Jan. 2009, pp. 50-52, Publisher: NASA, Published in: US.

* cited by examiner

*Primary Examiner* — Hoang Nguyen
(74) *Attorney, Agent, or Firm* — DeMont & Breyer, LLC

(57) ABSTRACT

An Ocean Thermal Energy Conversion (OTEC) system is disclosed. The OTEC system generates electrical energy based on a difference in the temperatures of the water from a surface region of a body of water and a thermal mass whose temperature is based on the temperature of water from a deep water region of the body of water. The thermal mass attains a desired temperature while it is positioned in the deep water region, with which it is thermally coupled. The present invention uses a bulk transport vessel to carry the thermal mass from the deep water region to a depth where it can be thermally coupled with the OTEC system.

33 Claims, 7 Drawing Sheets

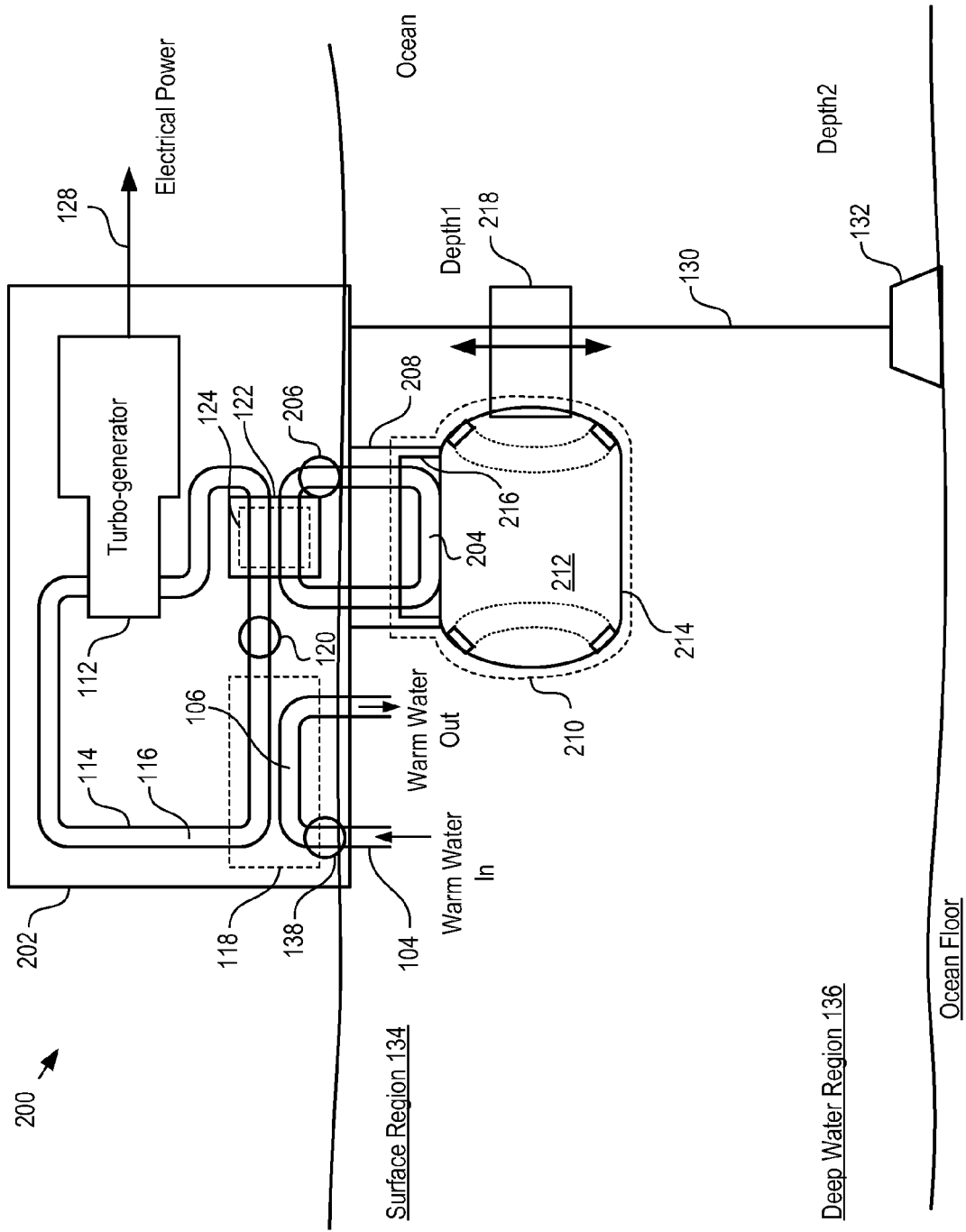

OCEAN THERMAL ENERGY CONVERSION SYSTEM

FIELD OF THE INVENTION

The present invention relates to power generation in general, and, more particularly, to ocean thermal energy conversion.

BACKGROUND OF THE INVENTION

Non-petroleum-based energy generation is an area of high technical and political interest. Systems that produce energy without the combustion of petroleum products potentially offer alternatives to conventional energy generation plants that are renewable, cleaner, potentially cheaper, and potentially more reliable.

Ocean thermal energy conversion (OTEC) is one such promising energy technology. An OTEC system converts solar radiation to electrical energy by using a naturally occurring temperature difference between water at the surface of a large body of water and water thousands of meters deep to drive a power-producing cycle. As long as the temperature between the warm surface water and the cold deep water differs by about 20° C., an OTEC system can produce a significant amount of power. Large bodies of water, such as oceans, therefore, represent vast renewable energy resources, which can be relatively easy to access.

A typical conventional OTEC system uses an electrical generation system, which is located at the surface and produces electrical energy using the temperature differential between two heat exchangers. A first heat exchanger uses the heat from warm surface water to vaporize a fluid contained in a closed-loop conduit. The energy of the vaporized fluid is used to turn a turbine, which turns an electrical generator that generates electrical energy. After the vaporized fluid passes through the turbine, it is channeled by the conduit to the second heat exchanger. The second heat exchanger uses cold water piped up from the depths of the body of water to condense the vapor back into the liquid state. The cold water received by the second heat exchanger is typically pumped up to it from a depth of 1000-2000 meters. The water is pumped to the heat exchanger through a cold water pipe that extends from the surface of the ocean to the deep water level. Another pump then pumps the working fluid back to the first heat exchanger where the cycle begins again.

Although a promising technology, to date, the use of OTEC power generation has been limited by a number of technical challenges. First, the significant amount of energy required to run an OTEC plant reduces its overall benefits. Second, conventional OTEC plants are highly susceptible to damaging winds, waves, and hurricanes and other storms. Finally, an OTEC plant requires complex and expensive infrastructure to enable its deployment.

SUMMARY OF THE INVENTION

The present invention provides an OTEC system that comprises an electrical generation system that generates electrical energy based on a differential between the temperature of water from a first region near the surface of a body of water and the temperature of a thermal mass. The temperature of the thermal mass is based on the temperature of water in second region of the water body—specifically, a deep water region.

Like the prior art, the present invention enables the generation of electrical energy based on the temperature differential between water at a first depth (e.g., a shallow depth) of the body of water and water at a second, depth (e.g., a deep level) of the body of water, wherein the second depth is deeper than the first depth. In the prior art, water from each of the first depth and the second depth is pumped to an OTEC platform through a conduit. The water from the first depth might be drawn to the platform through a relatively short conduit. Water from the second depth is drawn to the platform through a large diameter, very long conduit, which extends from the platform at the surface to a deep water region.

In contrast to the prior art, the present invention does not use a long water conduit to draw water from the deep water region. Instead, the present invention uses a submersible, insulated vessel to transport a thermal mass from the deep water level to a depth where the thermal mass can be thermally coupled to the OTEC system. While the vessel is positioned at the deep water region, the thermal mass and the cold water are thermally coupled. As a result, the thermal mass attains a temperature that is based on the temperature of the cold water in the deep water region. Once the thermal mass reaches a desired temperature, the vessel moves upward to the depth where it can be coupled to the OTEC platform. In some embodiments, this depth is approximately at the surface. In some embodiments, this depth is an intermediate depth between the surface and the deep water region. In such embodiments, the thermal mass and the OTEC system are thermally coupled by means of a short conduit that extends from the OTEC platform to the intermediate depth. In some embodiments, multiple vessels, each having a thermal mass, are used so that while one thermal mass is thermally coupled with the OTEC platform, another can be located at the deep water region to enable its thermal mass to come to its desired temperature. Further additional vessels can be in transit between the OTEC platform and the deep water level. In such embodiments, electrical energy generation can be maintained nearly continuously.

In some embodiments, the OTEC system comprises a generator that generates electricity based on a temperature differential between a first heat exchanger and a second heat exchanger. The first heat exchanger is thermally coupled with water from the surface region of the body of water. The temperature of the first heat exchanger, therefore, is based on the temperature of water from near the surface of the body of water. The second heat exchanger is thermally coupled with the thermal mass after the thermal mass has been raised from the deep water region. The temperature of the second heat exchanger, therefore, is based on the temperature of the water at the deep water region.

In some embodiments, the thermal mass comprises a clathrate compound. In some embodiments, the clathrate compound has a freezing point that is higher than the temperature of the water at the deep level region. In some of these embodiments, the present invention derives advantage from the fact that the buoyancy of the clathrate compound becomes more positive when it freezes. As a result, little or no energy is required to raise a vessel containing a clathrate compound-based thermal mass from the deep water region to the depth at which it is coupled to the OTEC system.

In some embodiments, the vessel takes on a volume of water from the deep water region to form the thermal mass. In some embodiments, this water is thermally coupled with the OTEC system through an intermediate fluid. In some embodiments, this water is pumped directly to a heat exchanger of the OTEC system.

In some embodiments, the electrical generation system is based on a Rankine-cycle engine and a turbogenerator. In some embodiments, the electrical generation system comprises a solid-state thermoelectric device.

An embodiment of the present invention comprises: an electrical generation system, wherein the electrical generation system generates electrical energy based on a temperature difference between a first thermal mass and a second thermal mass; the first thermal mass, wherein the temperature of the first thermal mass is based on the temperature of water at a first depth of a body of water; the second thermal mass, wherein the temperature of the second thermal mass is based on the temperature of water at a second depth of the body of water; and a vessel, wherein the vessel contains the second thermal mass, and wherein the vessel is movable between the second depth and a third depth of the body of water.

BRIEF DESCRIPTION OF THE DRAWINGS

FIG. 2B depicts a schematic diagram of a portion of an OTEC power generation system having a thermally coupled heat sink in accordance with an illustrative embodiment of the present invention.

DETAILED DESCRIPTION

Figure 1:
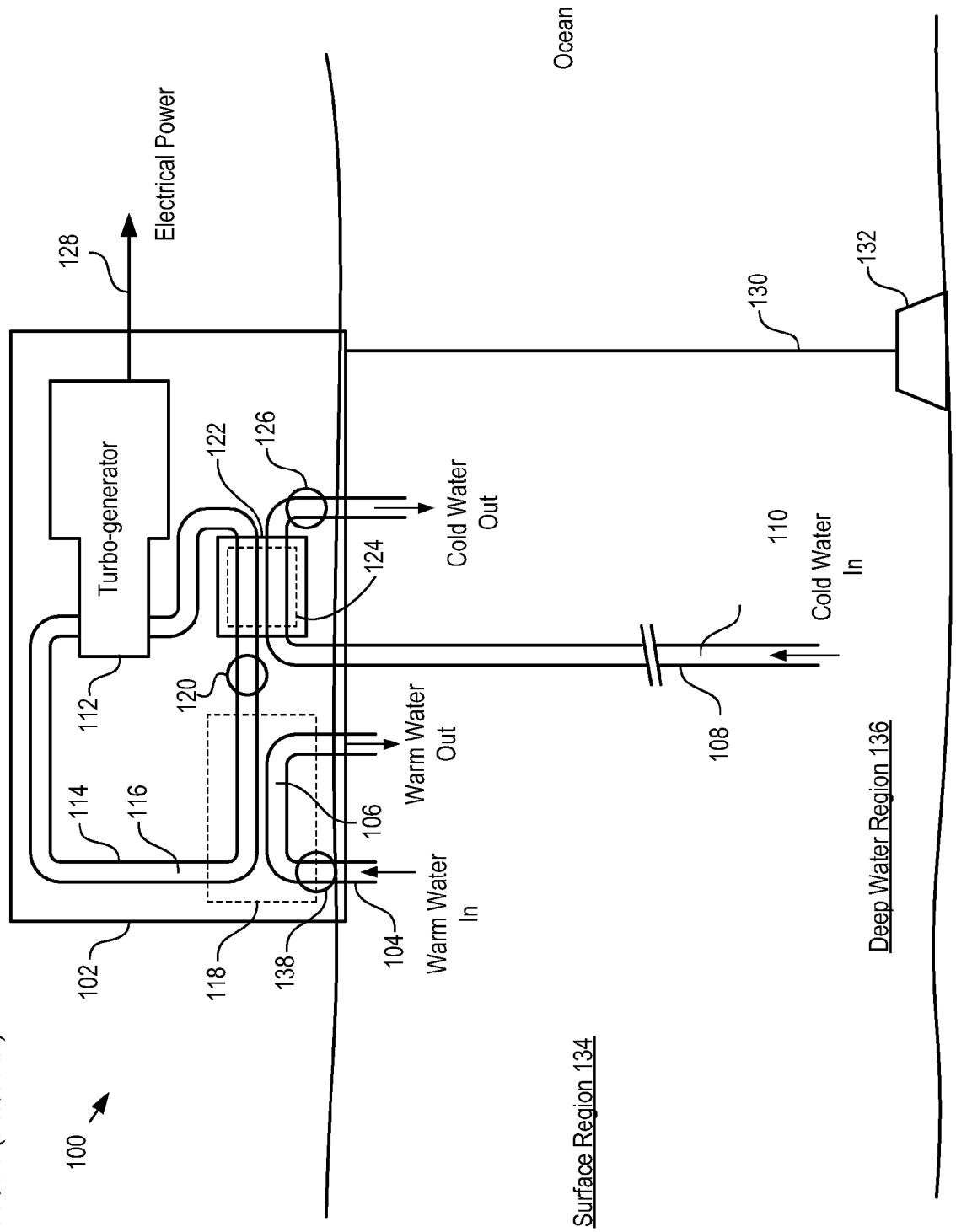
FIG. 1 depicts a schematic diagram of a portion of a typical OTEC power generation system in accordance with the prior-art.

FIG. 1 depicts a schematic diagram of a portion of a typical OTEC power generation system in accordance with the prior-art. OTEC system 100 comprises platform 102, surface water conduit 104, deep water conduit 108, turbo-generator 112, closed-loop conduit 114, heat exchanger 118, pump 120, and condenser 122. Turbo-generator 112, closed-loop conduit 114, heat exchanger 118, pump 120, and condenser 122 collectively define an electrical generation system comprising a Rankine-cycle engine and a turbogenerator.

Platform 102 is a conventional floating energy-plant platform. Platform 102 is anchored to the ocean floor by mooring line 130, which is connected to anchor 132. Anchor 132 is embedded in the ocean floor. In some instances, platform 102 is unanchored to the ocean floor and platform 102 is allowed to drift, such as in what is commonly referred to as a "grazing plant."

Surface water conduit 104 is a large-diameter pipe suitable for drawing water from surface region 134 into heat exchanger 118.

Closed-loop conduit 114 is a closed-circuit loop of pipe that contains a working fluid 116, such as ammonia. It should be noted that ammonia is only one potential working fluid, and one skilled in the art will recognize that other fluids can be used as working fluid 114. Typically it is desirable that working fluid 114 have a large change in vapor pressure between the temperature of the water at the surface region and the temperature of the water at the deep water region. Other considerations for the selection of a suitable working fluid include corrosiveness, thermal capacity, thermal conductivity, median pressure, and environmental hazard.

Closed-loop conduit 114 and surface water conduit 104 are thermally coupled at heat exchanger 118. As a result, working fluid 116 and surface water 106 are also thermally coupled at heat exchanger 118. This enables the heat of surface water 106 vaporizes working fluid 116. The expanding vapor turns turbo-generator 112, which generates electrical energy and provides it on output cable 128.

After passing through turbo-generator 112, the vapor is conveyed to condenser 122, which comprises heat exchanger 124. At heat exchanger 124, closed-loop conduit 114 and deep water conduit 108 are thermally coupled, which enables the thermal coupling of the vaporized working fluid 116 and cold water 110. Cold water 110 is drawn from deep water region 136 by pump 126. Typically deep water region 136 is 1000+ meters below the surface of the body of water. Water at this depth is at a substantially constant temperature of a few degrees centigrade.

Cold water 110 acts as a heat sink for vaporized working fluid 116 at heat exchanger 124. As a result, the hot vaporized working fluid 116 is cooled by cold water 110, which is pumped through deep water conduit 108. Once it is condensed, pump 116 recycles working fluid 116 back into heat exchanger 118 where it is vaporized again to continue the cycle that powers turbo-generator 112.

There are several drawbacks to conventional OTEC systems, such as OTEC system 100. First, it is difficult and energy intensive to pump cold water up from depths of 1000+ meters. This challenge is further exacerbated by the fact that cold water is more dense than warm water, which increases the energy required to draw it up to the surface. This significantly reduces the benefits of using an OTEC approach for power generation.

Second, deep water conduit 108 typically has a diameter within the range of 4 meters to 10 meters and a length of 1000+ meters. Such a conduit is difficult and expensive to manufacture.

Third, the size and length of deep water conduits makes them susceptible to damage from environmental conditions, such as strong currents, storms, and wave action. As a result, complicated and expensive infrastructure is required to protect these conduits from damage. For example, numerous recent efforts have been made to improve the reliability of cold water pipes. These include the development of flexible pipes, inflatable pipes, rigid pipes made from steel, plastics, and composites, and gimbal-mounted pipes. Even with such proposed innovations, long cold water pipes remain a significant reliability and cost issue.

Figure 2A:
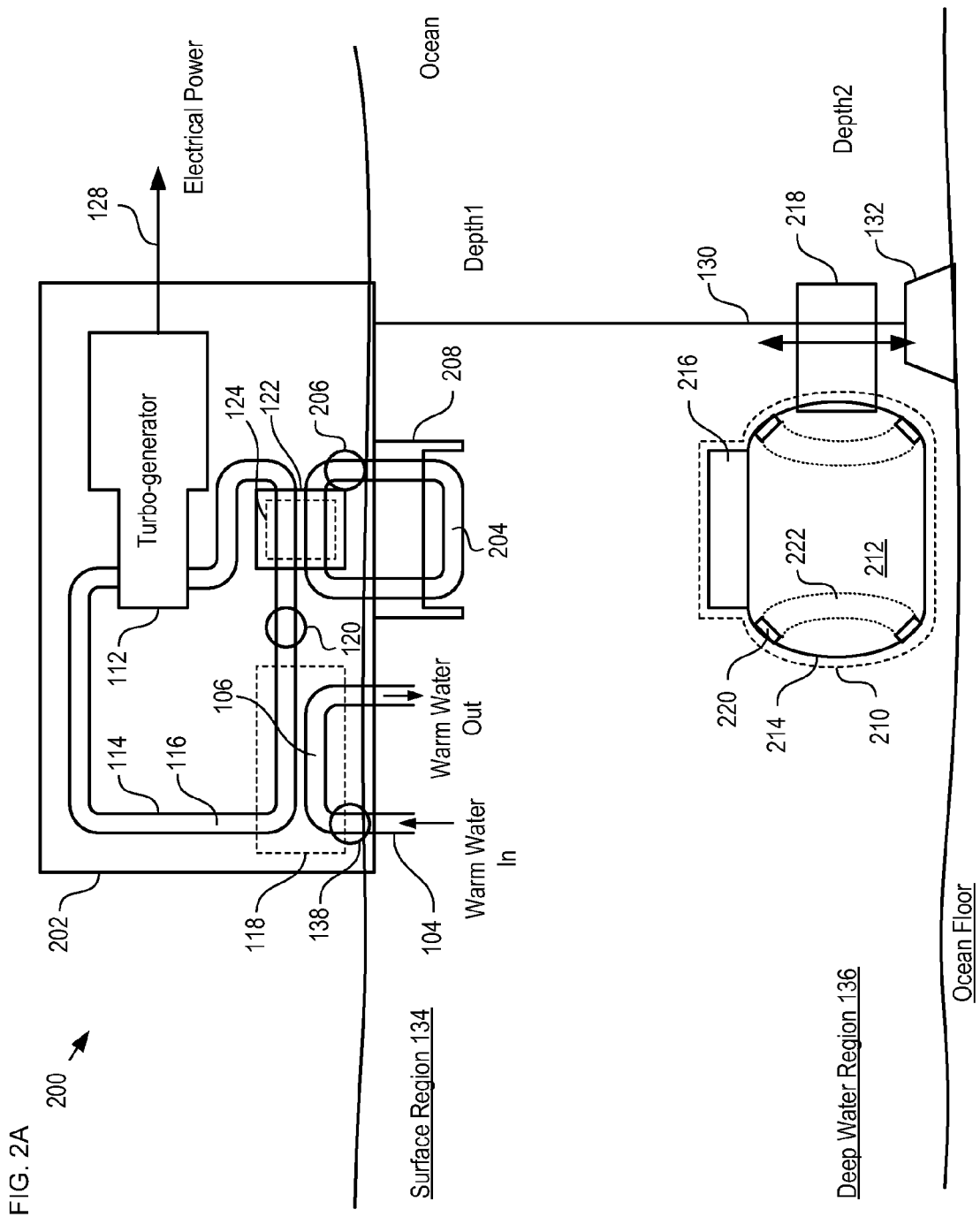
FIG. 2A depicts a schematic diagram of a portion of an OTEC power generation system having a thermally uncoupled heat sink in accordance with an illustrative embodiment of the present invention.

FIGS. 2A and 2B depict a schematic diagram of a portion of an OTEC power generation system, in an uncoupled and coupled state, respectively, in accordance with an illustrative embodiment of the present invention. OTEC system 200 comprises platform 202, surface water conduit 104, turbo-generator 112, closed-loop conduit 114, heat exchanger 118, pump 120, condenser 122, condenser conduit 204, condenser pump 206, retaining collar 208, vessel 210, and actuator 218. As in OTEC system 100, turbo-generator 112, closed-loop conduit 114, heat exchanger 118, pump 120, and condenser 122 collectively define an electrical generation system comprising a Rankine-cycle engine and a turbogenerator.

In contrast to OTEC system 100, OTEC system 200 uses bulk transport of a thermal mass to provide a heat sink to heat exchanger 124. The heat sink is provided by positioning a vessel that contains a thermal mass at a position in deep water region 136. Once the thermal mass has attained a desired temperature, the vessel is coupled to platform 202, which enables the cold thermal mass and the vaporized working fluid at condenser 122 to be thermally coupled. In other words, once coupled, the cold thermal mass acts as a heat sink for vaporized working fluid 116 at heat exchanger 124.

OTEC system 200 is described herein in conjunction with an exemplary method for generating electrical energy using bulk transport of a thermal mass.

Figure 3:
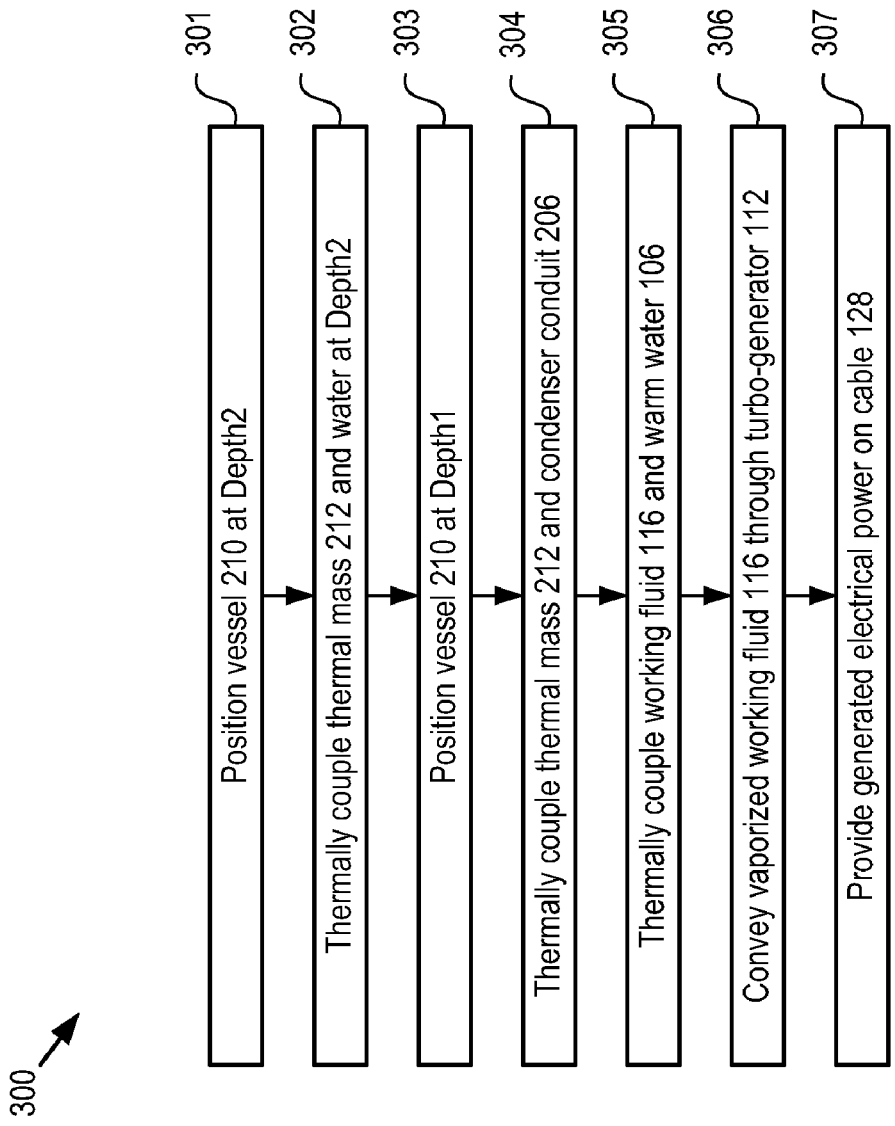
FIG. 3 depicts operations of a method suitable for generating electrical energy in accordance with the illustrative embodiment of the present invention.

FIG. 3 depicts operations of a method suitable for generating electrical energy in accordance with the illustrative embodiment of the present invention. FIG. 3 is described herein with continuing reference to FIGS. 2A and 2B. Method 300 begins with operation 301, wherein vessel 210 is positioned at depth2.

Vessel 210 is a thermally insulated holding tank that is suitable for the bulk transport of a thermal mass between depth1 and depth2. For the purposes of this specification, including the appended claims, the term "vessel" means a craft comprising a substantially enclosed volume for holding a thermal mass. It should be noted that the term vessel, as used herein, excludes meanings that would encompass tubes, conduits, pipes, and the like.

Vessel 210 comprises chamber 214 and docking collar 216. Vessel 210 holds thermal mass 212 in chamber 214, which has a volume capacity within the range of approximately 100,000 cubic meters ($m^3$) and 2,000,000 $m^3$, and typically 1,000,000 $m^3$. Thermal mass 212 is a clathrate compound. Thermal mass 212 is characterized by a freezing point that is higher than the temperature of the water at depth2.

Clathrate compounds are well-known substances in which one chemical can be trapped and held within a lattice of another type of chemical. The heat capacity of a clathrate compound can be as high as 80-100 times that of a comparable volume of water. The material properties of a clathrate compound are dependent upon the specific types of chemical used, as well as the ratio of the chemicals. As a result, a clathrate compound having a desired freezing point can readily be formed by one skilled in the art. Suitable materials for use in forming thermal mass 212 include, without limitation, propane, methane, ethane, other light hydrocarbons, hydrocarbon mixtures, anti-freeze compounds, and the like.

In some embodiments, thermal mass 212 comprises a "phase-change material" other than a clathrate compound. For the purposes of this Specification, included the appended claims, a phase change material is a material that freezes at a temperature equal to or higher than that of the water at depth2.

At operation 302, thermal mass 212 is thermally coupled with cold water at depth2. Thermal mass 212 is contained in a plurality of bladders, or chambers, that are interposed by water channels 222. Water channels 222 can be opened to the outside environment by valves 220. Water channels 222 enable the flow of sea water through thermal mass 212, thereby making the heat transfer between thermal mass 212 and the water in deep water region 136 more efficient. In other words, at depth2, valves 220 are opened, which enables cold sea water to flow through thermal mass 212.

Vessel 210 is held at depth2 for a time sufficient for a desired fraction of thermal mass 212 to freeze, thereby forming a semi-frozen slurry. In some embodiments, vessel 210 is held at depth2 for a time sufficient for thermal mass 212 to freeze completely. In some embodiments, vessel 210 is held at depth2 for a time sufficient for thermal mass 212 to reach a desired temperature, but not freeze. In some embodiments, a monitor provides a signal indicative of the fraction of thermal mass 212 that has frozen.

Once thermal mass 212 has reached the desired temperature, valves 220 are closed so that thermal mass 212 is substantially thermally insulated within vessel 210.

Turning now to FIG. 2B, at operation 303, vessel 210 rises to depth1. At depth1, docking collar 216 engages retaining collar 208 and holds vessel 210 to platform 202. The move of vessel 210 from depth2 to depth1 is enabled by actuator 218. Actuator 218 is a tractor engine that grips mooring line 130 and draws vessel 210 up its length. Although in the illustrative embodiment actuator 218 is a tractor engine, it will be clear to one skilled in the art, after reading this specification, how to specify, make, and use alternative embodiments of the present invention wherein actuator 218 comprises other than a tractor engine. Suitable components for use in actuator 218 include, without limitation, hoists, lanyards, motors, self-propulsion systems, and the like. In some embodiments, the use of a clathrate compound as thermal mass 212 obviates the need for actuator 218, since clathrate ice typically becomes more buoyant as it freezes. In such embodiments, therefore, vessel 210 can be designed to have positively buoyancy when thermal mass 212 reaches its desired temperature at depth2 and negative buoyancy when the temperature of thermal mass 212 reaches a temperature close to that of the water at depth1.

In some embodiments, thermal mass 212 is used to cool surface water that is pumped to condenser 122. In such embodiments, condenser conduit 204 is replaced by a short cold water conduit. Further, in such embodiments, valves 220 are opened to enable a flow of surface water through thermal mass 212, thereby providing efficient cooling of the surface water.

In some embodiments, OTEC system 200 comprises a plurality of vessels. In such embodiments, while the thermal mass in one vessel is thermally coupled with condenser conduit 204, another vessel is positioned at depth2 where its thermal mass is being cooled by the water in deep water region 136. In some of these embodiments, additional vessels are in transit between depth1 and depth2.

At operation 304, condenser conduit 204 and thermal mass 212 are thermally coupled and the fluid within condenser conduit 204 is circulated by pump 206. The fluid within condenser conduit 204 acts as an intermediate material that thermally couples thermal mass 212 and vaporized working fluid 116 at heat exchanger 122. As a result, thermal mass 212 acts as a heat sink for vaporized working fluid 116 at heat exchanger 124, in analogous fashion to cold water 110 described above and with respect to FIG. 1.

It should be noted that the clathrate compound of thermal mass 212 is characterized by an equilibrium vapor pressure for its propane constituent. The equilibrium vapor pressure of the propane is the pressure exerted by the propane vapor when it is in equilibrium with the clathrate compound at a given temperature. In other words, for any given temperature, the equilibrium vapor pressure is the minimum pressure required to keep the propane from boiling out of the clathrate compound.

As vessel 210 approaches surface region 134, the temperature of the environment surrounding the clathrate compound increases and the pressure exerted on the vessel decreases. Further, as thermal mass 212 warms during its use as a thermal sink, the temperature of the clathrate compound increases. As a result, in some cases, hydrostatic pressure is not sufficient to ensure that the propane does not boil out of the clathrate compound. In some embodiments, therefore, chamber 214 must be pressurized to a pressure greater than the equilibrium vapor pressure of the propane to maintain the composition of the clathrate compound.

At operation 305, working fluid 118 and surface water 106 are thermally coupled at heat exchanger 118. As result, working fluid 118 is vaporized. Surface water 106 is pumped through heat exchanger 118 by pump 138.

At operation 306, the expanding vapor is conveyed to turbo-generator 112.

At operation 307, pressure induced by the expanding vapor turns turbo-generator 112 to enable it to generate electrical energy. The generated electrical energy is provided on output cable 128.

In some embodiments, OTEC system 200 comprises an electrical generation system other than one based on a Rankine-cycle engine and turbogenerator. Elements suitable for use in an electrical generation system in accordance with the present invention include, without limitation, solid-state thermoelectric elements, Peltier devices, and the like.

The present invention derives significant advantages over the prior art due to its use of bulk transport of the cold thermal mass. Specifically, the present invention obviates the need for deep water conduit 108; therefore, the present invention mitigates or avoids the drawbacks described above and with respect to FIG. 1.

It should be noted that, although the present invention is described in the context of a warm surface water/cold deep water OTEC application, the present invention is also suitable for use in cold environments wherein surface water is colder than water in deep water regions.

Figure 4:
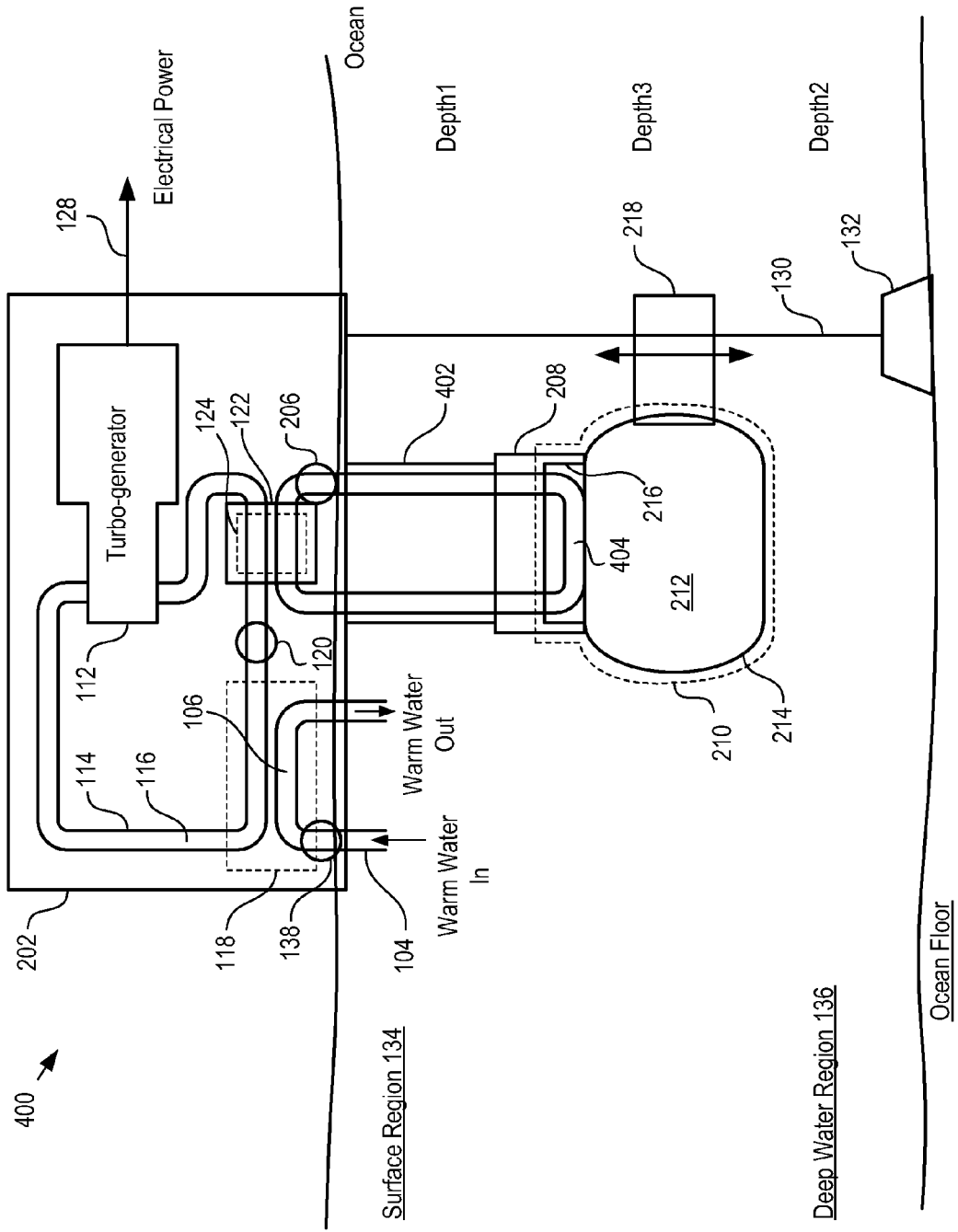
FIG. 4 depicts a schematic diagram of a portion of an OTEC power generation system in accordance with a first alternative embodiment of the present invention.

FIG. 4 depicts a schematic diagram of a portion of an OTEC power generation system in accordance with a first alternative embodiment of the present invention. OTEC system 400 comprises platform 202, surface water conduit 104, turbo-generator 112, closed-loop conduit 114, heat exchanger 118, pump 120, condenser 122, interface 402, condenser pump 206, condenser conduit 404, retaining collar 208, vessel 210, and actuator 218.

OTEC system 400 is analogous to OTEC system 200, with the exception that vessel 210 does not need to travel all the way to depth1. Instead, vessel 210 travels between depth2 and depth3. Depth3 is between depth1 and depth2. As a result, OTEC system 400 derives some of the advantages of OTEC system 400 over prior-art systems.

Interface 402 is a conduit that extends to depth3. Interface 402 has a length within the range of approximately 75 meters (m) to approximately 400 m. In the first alternative embodiment, the length of interface 402 is approximately 200 m.

It should be noted that, in some embodiments, a length of interface 402 of at least 200 m obviates the need for vessel 210 to be pressurized. This is due to the fact that below approximately 200 m, the temperature and pressure of the environment that surrounds vessel 210 is sufficient to ensure that the propane constituent of the clathrate compound does not boil out of the mixture.

Interface 402 encloses condenser conduit 404, which is approximately the same length as interface 402. Condenser conduit 404 is analogous to condenser conduit 204.

In similar fashion to OTEC system 200, vessel 210 is positioned at depth2 until thermal mass 212 attains a desired temperature. Vessel 210 then rises to depth3 and docking collar 216 engages retaining collar 208. As a result, vessel 210 is engaged with interface 402. Once vessel 210 is engaged with interface 402, OTEC system 400 operates in nearly identical fashion as OTEC system 200.

Figure 5:
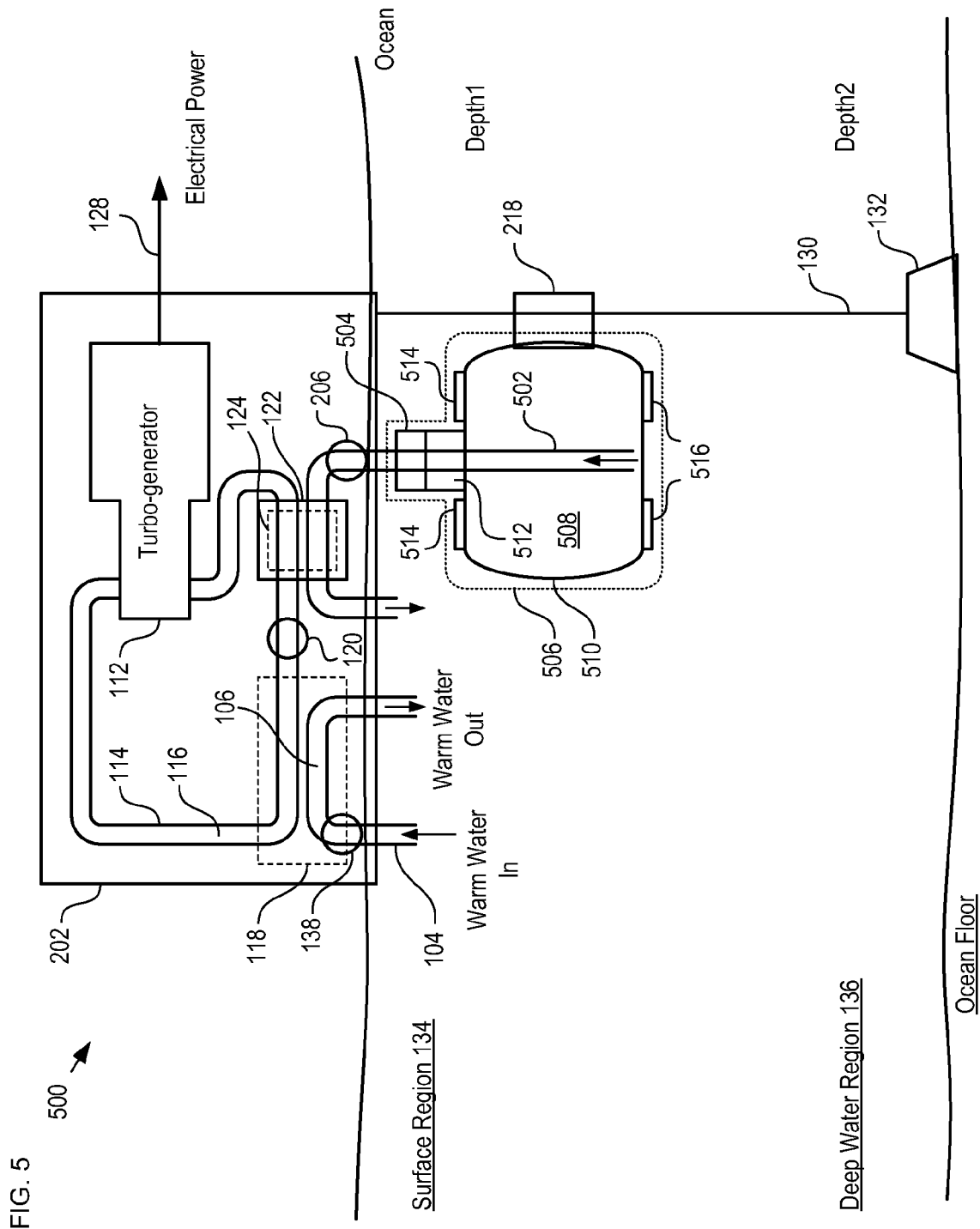
FIG. 5 depicts a schematic diagram of a portion of an OTEC power generation system in accordance with a second alternative embodiment of the present invention.

FIG. 5 depicts a schematic diagram of a portion of an OTEC power generation system in accordance with a second alternative embodiment of the present invention. OTEC system 500 comprises platform 202, surface water conduit 104, cold water conduit 502, turbo-generator 112, closed-loop conduit 114, heat exchanger 118, pump 120, condenser 122, pump 518, vessel 506, and actuator 218.

Cold water conduit 502 is analogous to deep water conduit 108; however, cold water conduit 502 has a length within the range of approximately 25 m to approximately 400 m. In addition, cold water conduit comprises retaining collar 504, which mates to docking collar 512 of vessel 506.

Vessel 506 is a thermally insulated holding tank suitable for containing a volume of water within the range of 100,000 m$^3$ to approximately 2,000,000 m$^3$. Vessel 506 comprises chamber 510, docking collar 512, and doors 514 and 516.

In operation, vessel 506 submerges to depth2, via actuator 218. At depth2, doors 514 and 516 are opened to enable warm water held by chamber 510 to be replaced by cold water from deep water region 136, thereby forming thermal mass 508. In some embodiments, vessel 506 includes a local OTEC power plant and/or pumps to facilitate the transfer of water into and out of chamber 510.

Once chamber 510 is filled with cold water, doors 514 and 516 are closed, thereby sealing chamber 510 and thermally insulating thermal mass 508.

Vessel 506 is then raised to depth1, where cold water conduit 502 is inserted into thermal mass 508 and docking collar 512 engages with retaining collar 504.

Cold water from thermal mass 508 is then pumped through cold water conduit 502 and into heat exchanger 124 by pump 518.

OTEC system 500 then operates in similar fashion to OTEC system 100 until thermal mass 508 is exhausted, or nearly exhausted. Once thermal mass 508 is exhausted, vessel 506 is disengaged from platform 202 and it submerges to depth2, where the cycle begins again. In some embodiments, doors 514 and 516 are opened during the descent of vessel 506.

In some embodiments, cold water pipe 502 has a length that is within the range of approximately 200 m to approximately 350 m. In such embodiments, vessel 506 is raised by actuator 218 to a depth3, which interposes depth1 and depth2. Once at depth3, docking collar 512 is engaged with retaining collar 504 and the system operates as described above.

Figure 6:
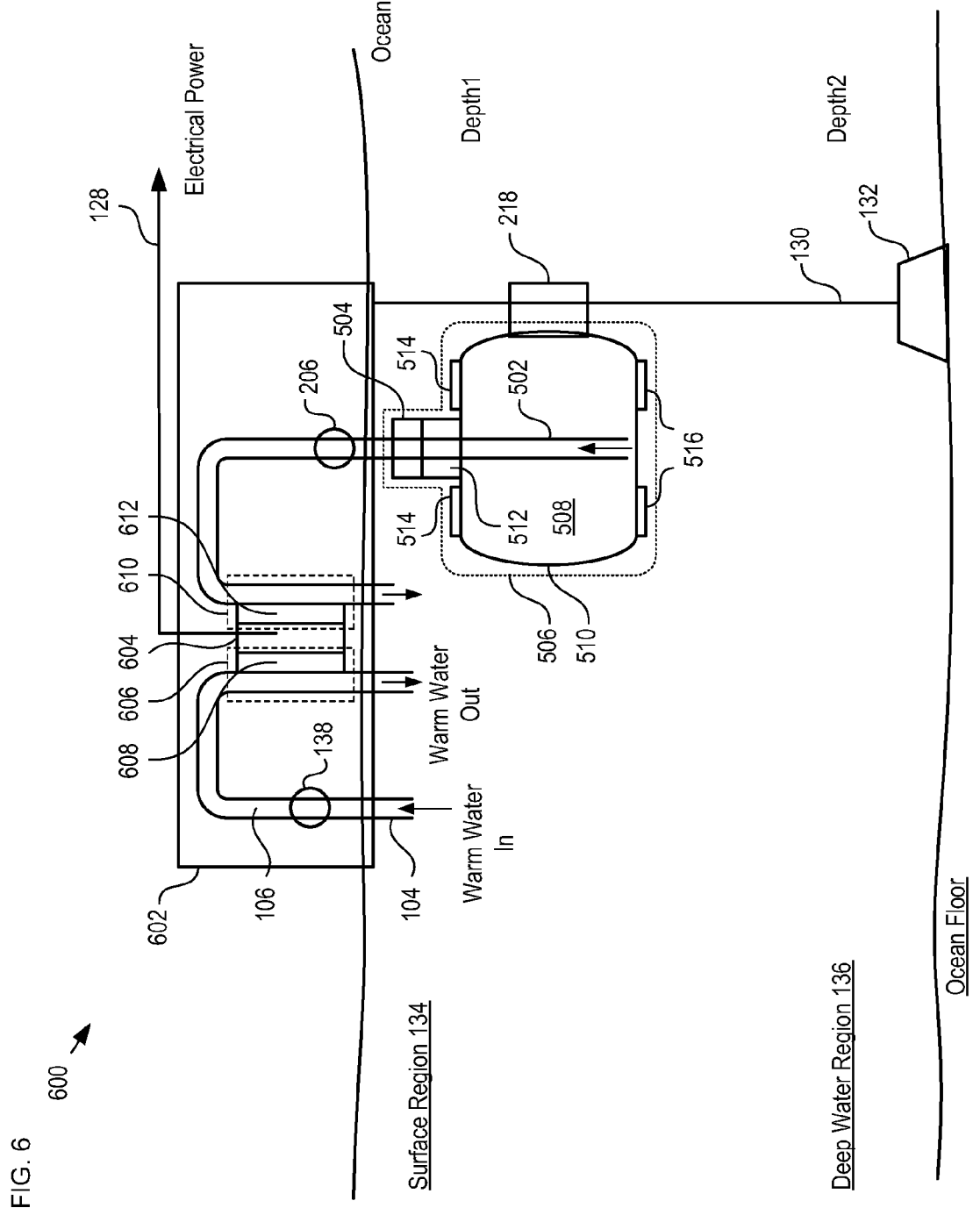
FIG. 6 depicts a schematic diagram of a portion of an OTEC power generation system in accordance with a third alternative embodiment of the present invention.

FIG. 6 depicts a schematic diagram of a portion of an OTEC power generation system in accordance with a third alternative embodiment of the present invention. OTEC system 600 comprises platform 602, surface water conduit 104, cold water conduit 502, solid-state thermoelectric device 604, heat exchanger 606, heat exchanger 610, hot plate 608, cold plate 612, pump 138, pump 518, vessel 506, and actuator 218.

Platform 602 is analogous to platform 202; however, platform 602 comprises a more simple set of conduits for pumping warm and cold water through heat exchangers 606 and 610.

Thermoelectric element 604 is a solid-state thermoelectric device that comprises a bismuth-telluride alloy. Thermoelectric element 604 generates an open-circuit voltage in response to a thermal gradient placed across it. Commercial examples of thermoelectric element 604 include HZ modules available from Hi-Z Technology, Inc. In some embodiments, thermoelectric element 604 comprises a thermoelectric material other than bismuth-telluride. Thermoelectric materials suitable for use in thermoelectric element 604 include, without limitation: semiconductor materials, such as silicon, silicon-germanium, and silicon carbide; and quantum-well devices.

In some embodiments, thermoelectric element 604 is a solid-state element that generates electrical energy by means of the Peltier effect.

In operation, pump 138 draws warm surface water from surface region 134 and pumps it through surface water conduit 104.

Surface water conduit 104 and hot plate 608 collectively define heat exchanger 606. At heat exchanger 606, heat from warm water 106 warms hot plate 608. Hot plate 608 is thermally coupled with a first surface of thermoelectric element 604.

As described above, and with respect to FIG. 5, vessel 506 is positioned at depth1 and contains a quantity of cold water (i.e., thermal mass 508) that has been transported from depth2 at deep water region 136. Pump 518 pumps cold water from vessel 506 through cold water conduit 502.

Cold water conduit 502 and cold plate 612 collectively define heat exchanger 610. At heat exchanger 610, the cold water cools cold plate 612. Cold plate 612 is thermally coupled with a second surface of thermoelectric element 604.

By virtue of the temperature differential between the first and second surfaces of thermoelectric element 604, thermoelectric element 604 generates electrical energy and provides it on output cable 128.

Once thermal mass 508 has been depleted, vessel 506 returns to depth2, where it is refilled with cold water. In some embodiments, a second vessel, which was filled with cold water while vessel 506 was coupled to platform 602 replaces vessel 506. As a result, nearly continuous operation of OTEC system 600 is possible. In some embodiments, additional vessels are employed as well.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   an electrical generation system, wherein the electrical generation system generates electrical energy based on a temperature difference between a first thermal mass and a second thermal mass;
   the first thermal mass, wherein the temperature of the first thermal mass is based on the temperature of water at a first depth of a body of water;
   the second thermal mass, wherein the temperature of the second thermal mass is based on the temperature of water at a second depth of the body of water; and
   a vessel, wherein the vessel contains the second thermal mass, and wherein the vessel is movable between the second depth and a third depth of the body of water.

2. The apparatus of claim 1 wherein the first thermal mass comprises water from a first region of the body of water, and wherein the first region comprises water at the first depth.

3. The apparatus of claim 1 wherein the second thermal mass comprises a phase-change material, and further wherein the temperature of the phase-change material is based on the temperature of the water at the second depth.

4. The apparatus of claim 3 wherein the phase-change material comprises a clathrate compound whose freezing point is equal to or greater than the temperature of the water at the second depth.

5. The apparatus of claim 1 wherein the vessel comprises a first opening that enables a transfer of water between the body of water and the vessel.

6. The apparatus of claim 5 wherein the second thermal mass comprises water from a first region of the body of water, and wherein the first region comprises water at the second depth.

7. The apparatus of claim 1 further comprising an actuator, wherein the actuator moves the vessel between the second depth and the third depth.

8. The apparatus of claim 1 further comprising a conduit, wherein the conduit conveys fluid between the third depth and the first depth.

9. The apparatus of claim 1 wherein the first depth and the third depth are substantially the same depth.

10. An apparatus comprising:
    an electrical generation system;
    a first heat exchanger, wherein the first heat exchanger and water that is at a first depth of a body of water are thermally coupled;
    a vessel, wherein the vessel contains a thermal mass whose temperature is based on the temperature of water at a second depth of the body of water, and wherein the vessel is movable between the second depth of the body of water and a third depth of the body of water; and
    a second heat exchanger, wherein the second heat exchanger and the thermal mass are thermally coupled when the vessel is at the third depth of the body of water;
    wherein the electrical generation system generates electrical energy based on a temperature differential between the first heat exchanger and the second heat exchanger.

11. The apparatus of claim 10 wherein the first depth and the third depth are the substantially the same depth.

12. The apparatus of claim 10 further comprising a conduit, wherein the conduit conveys a fluid between the first depth and the third depth.

13. The apparatus of claim 10 wherein the electrical generation system comprises a Rankine-cycle engine.

14. The apparatus of claim 10 wherein the electrical generation system comprises a solid-state thermoelectric element.

15. The apparatus of claim 10 wherein the thermal mass comprises a clathrate compound, and further wherein the freezing point of the clathrate compound is equal to or greater than the temperature of the water at the second depth.

16. The apparatus of claim 15 wherein the clathrate compound comprises a hydrocarbon.

17. The apparatus of claim 16 wherein the vessel is physically adapted to maintain an internal pressure that is greater than the equilibrium vapor pressure of the hydrocarbon.

18. The apparatus of claim 15 wherein the clathrate compound comprises a fluorohydrocarbon.

19. The apparatus of claim 16 wherein the vessel is physically adapted to maintain an internal pressure that is greater than the equilibrium vapor pressure of the fluorohydrocarbon.

20. The apparatus of claim 10 wherein the thermal mass is water from the second depth.

21. The apparatus of claim 20 further comprising a conduit, wherein the conduit conveys the thermal mass to the second heat exchanger.

22. A method comprising:
    thermally coupling a first heat exchanger and a first thermal mass, wherein the temperature of the first thermal mass is based on the temperature of water at a first depth of a body of water;
    providing a vessel that is movable between a second depth of the body of water and a third depth of the body of water, wherein the vessel contains a second thermal mass, and wherein the temperature of the second thermal mass is based on the temperature of water at the second depth of the body of water;
    thermally coupling a second heat exchanger and the second thermal mass while the vessel is at the third depth of the body of water; and generating electrical energy based on a temperature differential between the first heat exchanger and the second heat exchanger.

23. The method of claim 22 wherein the electrical energy is generated by an electrical generation system comprising a Rankine-cycle engine.

24. The method of claim 22 wherein the electrical energy is generated by an electrical generation system comprising a solid-state thermoelectric element.

25. The method of claim 22 further comprising:
   positioning the vessel at the second depth, wherein the second heat exchanger and the second thermal mass are thermally decoupled while the vessel is at the second depth; and
   thermally coupling the second thermal mass and water at the second depth.

26. The method of claim 25 further comprising providing the second thermal mass, wherein the second thermal mass comprises a phase-change material, and wherein positioning the vessel at the second depth enables the second thermal mass to attain a desired temperature.

27. The method of claim 26 wherein the second thermal mass is provided such that the phase-change material is a clathrate compound whose freezing point is equal to or greater than the temperature of the water at the second depth.

28. The method of claim 25 further comprising:
   thermally decoupling the second thermal mass and the water at the second depth; and
   moving the vessel to the third depth of the body of water, wherein the thermal coupling of the second heat exchanger and second thermal mass comprises thermally coupling of the second heat exchanger and second thermal mass while the vessel is at the third depth.

29. The method of claim 28 further comprising conveying a fluid between the first depth and the third depth, wherein the fluid thermally couples the second heat exchanger and the second thermal mass.

30. The method of claim 28 wherein the vessel is conveyed to the third depth, and wherein the third depth and the first depth are substantially the same depth.

31. The method of claim 22 further comprising providing the second thermal mass, wherein the second thermal mass is provided by operations comprising:
   enabling the vessel to take on water while the vessel is at the second depth;
   loading water from the second depth into the vessel while the vessel is at the second depth;
   sealing the vessel;
   moving the vessel from the second depth to the third depth, wherein the second depth is deeper than the third depth; and
   enabling the thermal coupling of the second heat exchanger and the second thermal mass while the vessel at the third depth.

32. The method of claim 31 wherein the thermal coupling of the second heat exchanger and the second thermal mass is enabled by conveying fluid between the first depth and the third depth.

33. The method of claim 31 wherein the thermal coupling of the second heat exchanger and the second thermal mass is enabled by conveying water from the second thermal mass to the second heat exchanger.

* * * * *